(12) United States Patent
Smith et al.

(10) Patent No.: US 7,825,051 B2
(45) Date of Patent: Nov. 2, 2010

(54) COLORED GLASS COMPOSITIONS

(75) Inventors: Dennis G. Smith, Butler, PA (US); Larry J. Shelestak, Bairdford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1175 days.

(21) Appl. No.: 11/331,287

(22) Filed: Jan. 12, 2006

(65) Prior Publication Data

US 2007/0161492 A1 Jul. 12, 2007

(51) Int. Cl.
*C03C 3/095* (2006.01)
*C03C 3/087* (2006.01)

(52) U.S. Cl. .............................. 501/64; 501/70; 501/71

(58) Field of Classification Search .................. 501/64, 501/70, 71
See application file for complete search history.

(56) References Cited

U.S. PATENT DOCUMENTS

| | | | |
|---|---|---|---|
| 5,776,845 A | 7/1998 | Boulos et al. | 501/70 |
| 5,851,940 A | 12/1998 | Boulos et al. | 501/71 |
| 6,407,021 B1 * | 6/2002 | Kitayama et al. | 501/70 |
| 6,548,434 B2 * | 4/2003 | Nagashima | 501/70 |
| 6,573,207 B2 | 6/2003 | Landa et al. | 501/64 |
| 6,610,622 B1 * | 8/2003 | Landa et al. | 501/64 |
| 6,716,780 B2 | 4/2004 | Landa et al. | 501/64 |
| 6,844,280 B2 * | 1/2005 | Koyama et al. | 501/70 |
| 6,878,653 B2 * | 4/2005 | Kitayama et al. | 501/70 |
| 6,949,484 B2 * | 9/2005 | Landa et al. | 501/64 |
| 6,962,887 B2 * | 11/2005 | Heithoff | 501/64 |
| 6,995,102 B2 | 2/2006 | Jones et al. | 501/70 |
| 2004/0121896 A1 * | 6/2004 | Landa et al. | 501/71 |
| 2004/0162212 A1 * | 8/2004 | Koyama et al. | 501/70 |
| 2004/0180775 A1 * | 9/2004 | Landa et al. | 501/64 |
| 2004/0209757 A1 * | 10/2004 | Landa et al. | 501/64 |
| 2004/0229744 A1 * | 11/2004 | Heithoff | 501/72 |
| 2005/0170944 A1 * | 8/2005 | Arbab et al. | 501/64 |
| 2005/0188725 A1 * | 9/2005 | Tullman et al. | 65/134.3 |
| 2005/0245385 A1 * | 11/2005 | Landa et al. | 501/70 |
| 2006/0270545 A1 * | 11/2006 | Landa et al. | 501/70 |
| 2007/0015654 A1 * | 1/2007 | Scheffler-Hudlet et al. | 501/70 |
| 2007/0037687 A1 * | 2/2007 | Thomsen et al. | 501/71 |
| 2007/0099788 A1 * | 5/2007 | Shelestak et al. | 501/64 |

FOREIGN PATENT DOCUMENTS

| | | |
|---|---|---|
| EP | 1 118 597 A1 | 7/2001 |
| EP | 1 201 615 A1 | 5/2002 |
| JP | 11 228176 | 8/1999 |
| JP | 11 278863 | 10/1999 |
| RU | 2 145 582 C1 | 2/2000 |
| SU | 1 470 679 A1 | 4/1989 |

OTHER PUBLICATIONS

"Architechtural Glass" Internet Article, Dec. 30, 2005, XP002435202, Retrieved from the Internet: URL:http://web.archive.org/web/20051230170504/http://corporateportal.ppg.com/NA/IdeaScapes/GlassOver view.htm.

* cited by examiner

Primary Examiner—Jerry Lorengo
Assistant Examiner—Elizabeth A Bolden
(74) Attorney, Agent, or Firm—Andrew C. Siminerio

(57) ABSTRACT

A glass composition is disclosed. The glass composition includes base glass composition including $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent, and BaO from 0 to 1 weight percent, and a colorant and property modifying portion including total iron from up to 0.02 weight percent, $CeO_2$ from 0.05 weight percent to 1.5 weight percent, CoO up to 50 PPM, Se up to 15 PPM, $Cr_2O_3$ up to 500 PPM, CuO up to 0.5 weight percent, $V_2O_5$ up to 0.3 weight percent, $TiO_2$ up to 1 weight percent, NiO up to 200 PPM, $Er_2O_3$ up to 3 weight percent, $MnO_2$ up to 0.6 weight percent, and $Nd_2O_3$ up to 2 weight percent, wherein the glass composition has a redox ratio up to 0.55.

15 Claims, No Drawings

COLORED GLASS COMPOSITIONS

FIELD OF THE INVENTION

The present invention relates to glass compositions, particularly, glass compositions that include minimal amounts of colorants and other property modifying materials but exhibit intense colors.

BACKGROUND OF THE INVENTION

Glass substrates are used in a variety of applications such as automotive applications, architectural applications, aerospace applications, etc. Glass substrates are also used in furniture (i.e., table tops, shelving, etc.) and appliances. Depending on the end use of the glass substrate, it is desirable for the glass substrate to exhibit certain (a) aesthetic properties, such as, but not limited to, color and (b) solar control properties, such as, but not limited to, total solar energy transmittance ("TSET"), visible light transmittance (Lta), etc.

The aesthetic properties and solar control properties of a glass substrate can be modified in several of different ways. A first way involves depositing a coating on the surface of a glass substrate. A second way involves changing the chemical composition (i.e., the type of materials that make up the glass composition and/or the weight percentages of the various materials in the glass composition) that make up the glass substrate. Oftentimes, colorants and/or other materials capable of modifying the solar properties of the glass composition are added to a well known base glass composition, such as a soda-lime-silica base glass composition, to provide a glass substrate capable of exhibiting unique performance properties. Although the effect of one colorant or one material capable of modifying the solar properties of the glass composition may be known (for example, it is known that adding FeO to a base glass composition increases the infrared (IR) absorption of the glass composition), it is the essence of invention to use various colorants and/or materials capable of modifying the solar properties of the glass composition, each colorant or material capable of producing a unique effect individually, to achieve a combination of properties collectively.

According to the present invention, specific materials capable of modifying the aesthetic and/or solar properties of a glass composition are added in specific amounts to a soda-lime-silica base glass composition to provide colored glass substrates. The glass substrates of the present invention can be exhibit various colors such as, but not limited to, blue, green, yellow, bronze and gray. The glass substrates of the present invention can also exhibit an Lta of equal to or greater than 80% which is generally desirable for glass substrates used in furniture and appliances.

SUMMARY OF THE INVENTION

In a non-limiting embodiment, the present invention is a glass composition comprising a base glass composition comprising: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent, and BaO from 0 to 1 weight percent, and a colorant and property modifying portion comprising: total iron up to 0.02 weight percent, $CeO_2$ from 0.05 to 1.5 weight percent, CoO up to 50 PPM, Se up to 15 PPM, $Cr_2O_3$ up to 500 PPM, CuO up to 0.5 weight percent, $V_2O_5$ up to 0.3 weight percent, $TiO_2$ up to 1 weight percent, NiO up to 200 PPM, $Er_2O_3$ up to 3 weight percent, $MnO_2$ up to 0.6 weight percent, and $Nd_2O_3$ up to 2 weight percent, wherein the glass composition has a redox ratio up to 0.55.

In another non-limiting embodiment, the present invention is a glass sheet comprising a glass composition that includes: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_2O$ from 0 to 5 weight percent, and BaO from 0 to 1 weight percent, and a colorant and property modifying portion comprising: total iron up to 0.02 weight percent, $CeO_2$ from 0.05 to 1.5 weight percent, CoO up to 50 PPM, Se up to 15 PPM, $Cr_2O_3$ up to 500 PPM, CuO up to 0.5 weight percent, $V_2O_5$ up to 0.3 weight percent, $TiO_2$ up to 1 weight percent, NiO up to 200 PPM, $Er_2O_3$ up to 3 weight percent, $MnO_2$ up to 0.6 weight percent, and $Nd_2O_3$ up to 2 weight percent, wherein the glass composition has a redox ratio up to 0.55 and wherein the glass sheet exhibits an Lta of equal to or greater than 70 percent at a thickness of 0.223 inches (5.664 mm).

In yet another non-limiting embodiment, the present invention is a method of making a glass composition comprising: processing batch materials to form a glass composition comprising: $SiO_2$ from 65 to 75 weight percent, $Na_2O$ from 10 to 20 weight percent, CaO from 5 to 15 weight percent, MgO from 0 to 5 weight percent, $Al_2O_3$ from 0 to 5 weight percent, $K_{2O\,from}$ 0 to 5 weight percent, and BaO from 0 to 1 weight percent, and a colorant and property modifying portion comprising: total iron up to 0.02 weight percent, $CeO_2$ from 0.05 weight percent to 1.5 weight percent, CoO up to 50 PPM, Se up to 15 PPM, $Cr_2O_3$ up to 500 PPM, CuO up to 0.5 weight percent, $V_2O_5$ up to 0.3 weight percent, $TiO_2$ up to 1 weight percent, NiO up to 200 PPM, $Er_2O_3$ up to 3 weight percent, $MnO_2$ up to 0.6 weight percent, and $Nd_2O_3$ up to 2 weight percent, wherein the glass composition has a redox ratio up to 0.55.

DETAILED DESCRIPTION OF THE INVENTION

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1.0 to 3.8, 6.6 to 9.7 and 5.5 to 10.

The glass composition of the present invention comprises a base glass portion and colorants and materials capable of modifying the performance properties of the glass. Both colorants and materials capable of modifying the solar control properties of the glass are referred to herein as "colorants and property modifying materials". According to the present invention, the base glass portion includes the components in the amounts shown in Table 1 below.

TABLE 1

Base Glass Portion

| Component | Concentration in the Glass Composition [Weight Percent based on the Total Weight of the Glass Composition] |
|---|---|
| $SiO_2$ | 65- 75% |
| $Na_2O$ | 10-20% |
| CaO | 5-15% |
| MgO | 0-5% |
| $Al_2O_3$ | 0-5% |
| $K_2O$ | 0-5% |
| BaO | 0-1% |

The described base glass portion is referred to in the art as a "soda-lime-silica" glass composition.

According to the present invention, various colorants and materials capable of modifying the solar performance properties of the glass are added to the base glass composition. The colorants and property modifying materials included in the glass composition of the invention include: iron oxides (both ferric oxide ($Fe_2O_3$) and ferrous oxide (FeO)) and cerium oxide ($CeO_2$).

According to the present invention, iron can be present in the glass composition as both ferric oxide ($Fe_2O_3$) and ferrous oxide (FeO). As is well known in the art, $Fe_2O_3$ is a strong absorber of ultraviolet radiation and is a yellow colorant. As is well known in the art, FeO is a strong absorber of infrared radiation and is a blue colorant.

The "total iron" present in the glass composition of the invention is expressed in terms of the weight percentage of "$Fe_2O_3$" present in the glass composition as is standard practice in the industry. This does not imply that all of the iron present in the glass composition is in the form of $Fe_2O_3$. According to the present invention, the total iron in the glass composition of the present invention ranges up to and including 0.02 weight percent based on the total weight of the glass composition, for example, from 0.005 to 0.02 weight percent.

The amount of iron present in the ferrous state in the glass composition of the present invention is expressed in terms of the weight percentage of "FeO" present in the glass composition as is standard practice in the industry. Although the amount of iron in the ferrous state is expressed as FeO, the entire amount in the ferrous state may not actually be present in the glass as FeO.

The glass composition of the present invention has a certain "redox ratio". As used herein, the "redox ratio" is the amount of iron in the ferrous state (expressed as "FeO") divided by the amount of total iron (expressed as "$Fe_2O_3$"). Glass compositions according to the present invention have a redox ratio up to 0.55, for example, from 0.05 to 0.525, or from 0.1 to 0.5.

According to the present invention, the glass composition of the present invention contains $CeO_2$ in an amount ranging from 0.05 weight percent to 1.5 weight percent, for example, from 0.50 to 1.25, or from 0.75 weight percent to 1.0 weight percent, where the weight percent is based on the total weight of the glass composition. $CeO_2$ is known in the art as a UV absorber.

$CeO_2$ is also known in the art as a powerful oxidizing agent that oxidizes iron present in the batch materials to form $Fe_2O_3$, which is a less powerful colorant than FeO.

In various non-limiting embodiments, the glass composition of the present invention can include one or more of the following optional colorants and other property modifying materials which are present primarily to determine the color exhibited by the glass composition: cobalt oxide (CoO), selenium (Se), chrome oxide ($Cr_2O_3$), copper oxide (CuO), vanadium oxide ($V_2O_5$), titania ($TiO_2$), nickel oxide (NiO), erbium oxide ($Er_2O_3$), manganese oxide ($MnO_2$) and neodymium oxide ($Nd_2O_3$).

According to the present invention, the glass composition can contain CoO in an amount up to 50 PPM, for example, from 2 PPM to 35 PPM or from 5 PPM to 25 PPM. CoO operates as a blue colorant and does not exhibit any appreciable infrared or ultraviolet radiation absorbing properties.

According to the present invention, the glass composition can contain Se in an amount up to 15 PPM, for example, from 3 PPM to 14 PPM or from 5 PPM to 12 PPM. Se is known in the art as an ultraviolet and infrared radiation absorbing colorant that imparts a pink or brown color (the exact color depends on the valence state) to soda-lime-silica glass.

According to the present invention, the glass composition can contain $Cr_2O_3$ in an amount up to 500 PPM, for example, from 10 PPM to 300 PPM, or from 20 PPM to 200 PPM. $Cr_2O_3$ is known in the art as a green colorant.

According to the present invention, the glass composition can contain CuO in an amount up to 0.5 weight percent, for example, up to 0.3 weight percent, or up to 0.1 weight percent, where the weight percent is based on the total weight of the glass composition. CuO is known in the art as a blue colorant.

According to the present invention, the glass composition can contain $V_2O_5$ in an amount up to 0.3 weight percent, for example, up to 0.2 weight percent, or up to 0.1 weight percent, where the weight percent is based on the total weight of the glass composition. $V_2O_5$ is known in the art as a green colorant.

According to the present invention, the glass composition can contain $TiO_2$ in an amount up to 1 weight percent, for example, up to 0.8 weight percent, or up to 0.6 weight percent, where the weight percent is based on the total weight of the glass composition. $TiO_2$ is known in the art as a yellow colorant and an absorber of ultraviolet radiation.

According to the present invention, the glass composition can contain NiO in an amount up to 200 PPM, for example, from 5 PPM to 100 PPM, or from 10 PPM to 50 PPM. NiO is known in the art as a brown colorant.

According to the present invention, the glass composition can contain $Er_2O_3$ in an amount up to 3 weight percent, for example, from 0.25 to 2 weight percent, or from 0.5 to 1.5 weight percent, where the weight percent is based on the total weight of the glass composition. $Er_2O_3$ is known in the art as a pink colorant.

According to the present invention, the glass composition can contain $MnO_2$ in an amount up to 0.6 weight percent, for example, from 0.1 to 0.5 weight percent, or from 0.2 to 0.4 weight percent, where the weight percent is based on the total weight of the glass composition. $MnO_2$ is known in the art as a purple colorant.

According to the present invention, the glass composition can contain $Nd_2O_3$ in an amount up to 2 weight percent, for example, from 0.25 to 1.5 weight percent, or from 0.5 to 1 weight percent, where the weight percent is based on the total weight of the glass composition. $Nd_2O_3$ is known in the art as a blue colorant.

Melting and refining aids such as sulfates ($SO_3$) discussed above, may be present in the glass composition of the invention.

The glass composition of the present invention can be produced by conventional glass making processes. For example, the glass composition can be formed from batch materials via crucible melts, a sheet drawing process, a float glass process, etc. Typically, well known batch materials are mixed with other components to form the starting materials which are processed into the glass compositions of the present invention.

In a non-limiting embodiment of the present invention, the colorants and property modifying materials are added to the batch materials in the form of nanoparticles.

In another non-limiting embodiment, the glass composition of the present invention is formed via a float glass process as is well known in the art.

As a result of the raw materials and/or equipment used to produce the glass composition of the present invention, certain impurities can be present in the final glass composition. Such materials are present in the glass composition in minor amounts and are referred to herein as "tramp materials". Tramp materials do not contribute to the performance properties of the glass. Tramp materials include, but are not limited to, SrO and $ZrO_2$.

In a non-limiting embodiment of the invention, the described glass composition is formed into a glass substrate and/or laminated glass article as is well known in the art. Glass substrates having various thicknesses can be formed. For example, glass substrates having a thickness of up to 24 mm can be formed.

In a non-limiting embodiment, a glass substrate according to the present invention exhibits an Lta of equal to or greater than 70 percent, for example, equal to or greater than 75 percent, or equal to or greater than 80 percent at a thickness of 0.223 inches (5.664 mm).

In a non-limiting embodiment of the invention, a glass substrate according to the present invention is used in furniture or appliances.

EXAMPLES

The present invention is illustrated by the following non-limiting examples. The Examples 1-4 were made in the following manner.

The batch materials shown in Table 2 were weighed out, mixed thoroughly and placed in a 4 inch platinum crucible in an electric resistance furnace set to a temperature of 2,600° F. (1,427° C.) and heated for 2 hours. The glass melt was then poured into water at room temperature (referred to as "glass fritting" in the art) to produce a glass frit. The glass frit was dried in an annealing oven set to a temperature of 1,100° F. (593° C.) for 20 minutes. The glass frit was placed back into a crucible, and the crucible was placed in an oven set to a temperature of 2,600° F. (1,427° C.) for 2 hours. The glass melt was cast on a metal table. The resulting glass sheet was placed into an annealing lehr set to a temperature of 1,125° F. (607° C.) for one hour. The power to the lehr was shut off, and the glass sheet was allowed to stay in the lehr for sixteen hours as it cooled down to room temperature. Examples made from the glass melts were ground and polished.

TABLE 2

Glass Batch Materials for Examples 1-4

|  | Ex. 1 | Ex. 2 | Ex. 3 | Ex. 4 |
|---|---|---|---|---|
| STARPHIRE ® Cullet[1] [g] | 500 | 500 | 500 | 500 |
| $Cr_2O_3$ [g] | 0.0156 | 0.0625 |  |  |
| CoO [g] |  |  | 0.0026 | 0.0104 |

[1]STARPHIRE ® cullet refers to glass that is commercially available from PPG Industries, Inc. (Pittsburgh, PA) under the name of STARPHIRE ® glass, which is broken up and added to the batch materials as described above.

Compositional information for the exemplary glass compositions made according to the present invention is shown below in Table 3. The concentration of the materials in the glass composition was determined by x-ray fluorescence chemical analysis. The redox ratio was calculated from the concentration of iron oxides determined to be present in the glass composition.

TABLE 3

Glass Composition Data for Examples 1-4

|  | Ex. 1 | Ex. 2 | Ex. 3 | Ex. 4 |
|---|---|---|---|---|
| redox | 0.147 | 0.050 | 0.208 | 0.224 |
| total iron [wt. %] | 0.0160 | 0.0150 | 0.0140 | 0.0150 |
| CoO [PPM] |  |  | 2 | 23 |
| $Cr_2O_3$ [PPM] | 37 | 115 | 7 | 5 |
| $CeO_2$[1] [wt. %] | 0.090 | 0.090 | 0.090 | 0.090 |

[1]$CeO_2$ and $Cr_2O_3$ are in the STARPHIRE ® cullet.

Table 4 shows various performance properties of the exemplary glass substrates having a thickness of 0.223 inches (5.6642 mm). The spectral properties of the Examples were measured using a Perkin Elmer Lambda 9 spectrophotometer. According to the present invention, the abovementioned performance properties are measured as described below. All solar transmittance data are calculated using air mass solar data according to ASTM am1.5 g (E892T.1). All of the transmittance values are integrated over the wavelength range using the Trapezoidal Rule, as is well known in the art.

The visible light transmittance (Lta) represents a computed value based on measured data using C.I.E. 1931 standard illuminant "A" over the wavelength range of 380 to 770 nanometers at 10 nanometer intervals.

The total solar ultraviolet transmittance (TSUV) represents a computed value based on measured data over the wavelength range of 300 to 400 nanometers at 5 nanometer intervals using the SAE 1796 standard.

The total solar infrared transmittance (TSIR) represents a computed value based on measured data over the wavelength range of 800 to 2100 nanometers at 50 nanometer intervals.

The total solar energy transmittance (TSET) represents a computed value based on measured transmittances from 300 to 2100 nanometers at 50 nanometer intervals.

Color is described in terms of dominant wavelength (DW) and the excitation purity (Pe) and represents computed values based on measured data using a C.I.E. 1931 standard illuminant "C" with a 2° observer.

The visible color was determined by a single observer and indicates the color visibly observed by an average person.

TABLE 4

Performance Properties for Examples 1-4

|  | Ex. 1 | Ex. 2 | Ex. 3 | Ex. 4 |
|---|---|---|---|---|
| Lta [%] | 89.81 | 87.94 | 90.08 | 81.29 |
| TSUV [%] | 70.57 | 69.40 | 70.98 | 70.54 |
| TSIR [%] | 89.82 | 91.08 | 89.32 | 88.25 |
| TSET [%] | 88.88 | 87.93 | 89.23 | 85.54 |
| DW [nm] | 561.36 | 560.79 | 486.26 | 477.98 |
| Pe [%] | 1.08 | 2.70 | 0.19 | 4.94 |
| Visible Color | green | green | blue | blue |

Based on Table 4, non-limiting examples of the glass composition of the present invention can be used to form glass substrates having a thickness of 0.223 inches (5.6642 mm) that exhibit various colors such as green and blue. Glass compositions according to the present invention can also exhibit one or more of the following performance properties in glass substrates having a thickness of 0.223 inches (5.664 mm): an Lta of equal to or greater than 80%, for example, equal to or greater than 85%; a TSET of less than 91%, for example, equal to or less than 87%; a TSUV of less than 72%, for example, equal to or less than 67%; a DW ranging from 470 to 585 nm; and a Pe up to 30%.

It will be readily appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A glass composition comprising a base glass composition comprising:

| | | |
|---|---|---|
| $SiO_2$ | 65 to 75 | weight percent, |
| $Na_2O$ | 10 to 20 | weight percent, |
| CaO | 5 to 15 | weight percent, |
| MgO | 0 to 5 | weight percent, |
| $Al_2O_3$ | 0 to 5 | weight percent, |
| $K_2O$ | 0 to 5 | weight percent, and |
| BaO | 0 to 1 | weight percent, | and a colorant and property modifying portion comprising:

| | | |
|---|---|---|
| total iron | up to 0.02 | weight percent, |
| $CeO_2$ | 0.05 to 1.5 | weight percent, |
| CoO | 0 to 50 | PPM, |
| Se | 0 to 15 | PPM, |
| $Cr_2O_3$ | 0 to 500 | PPM, |
| CuO | 0 to 0.5 | weight percent, |
| $V_2O_5$ | 0 to 0.3 | weight percent, |
| $TiO_2$ | 0 to 1 | weight percent, |
| NiO | 0 to 200 | PPM, |
| $Er_2O_3$ | 0 to 3 | weight percent, |
| $MnO_2$ | 0 to 0.6 | weight percent, and |
| $Nd_2O_3$ | 0 to 2 | weight percent, | wherein the glass composition has a redox ratio up to 0.55, and the colorant and property modifying portion further comprising $Er_2O_3$ in a range of 0.5 to 2 weight percent or $Nd_2O_3$ in a range of 0.5 to 2 weight percent.

2. The glass composition according to claim 1, wherein the redox ratio ranges from 0.05 to 0.525.

3. The glass composition according to claim 1, wherein the $CeO_2$ ranges from 0.75 weight percent to 1.0 weight percent.

4. The glass composition according to claim 1, wherein the redox ratio ranges from 1.0 to 0.5.

5. The glass composition according to claim 1, wherein at least one of the following materials is present in the recited amount: CoO from 2 to 35 PPM, Se from 3 to 14 PPM, $Cr_2O_3$ from 10 to 300 PPM, CuO up to 0.3 weight percent, $V_2O_5$ up to 0.2 weight percent, $TiO_2$ from 0.15 to 0.8 weight percent, NiO from 5 to 100 PPM, and $MnO_2$ from 0.1 to 0.5 weight percent.

6. A glass sheet made from the composition according to claim 1.

7. A glass sheet according to claim 6 that exhibits an Lta greater than or equal to 70% at a thickness of 0.223 inches (5.664 mm).

8. A glass sheet according to claim 7 that exhibits an Lta greater than or equal to 85% at a thickness of 0.223 inches (5.664 mm).

9. A glass composition comprising a base glass composition comprising:

| | | |
|---|---|---|
| $SiO_2$ | 65 to 75 | weight percent, |
| $Na_2O$ | 10 to 20 | weight percent, |
| CaO | 5 to 15 | weight percent, |
| MgO | 0 to 5 | weight percent, |
| $Al_2O_3$ | 0 to 5 | weight percent, |
| $K_2O$ | 0 to 5 | weight percent, and |
| BaO | 0 to 1 | weight percent, | and a colorant and property modifying portion comprising:

| | | |
|---|---|---|
| total iron | up to 0.02 | weight percent, |
| $CeO_2$ | 0.05 to 1.5 | weight percent, |
| CoO | 0 to 50 | PPM, |
| Se | 0 to 15 | PPM, |
| $Cr_2O_3$ | 0 to 500 | PPM, |
| CuO | 0 to 0.5 | weight percent, |
| $V_2O_5$ | 0 to 0.3 | weight percent, |
| $TiO_2$ | 0 to 1 | weight percent, |
| NiO | 0 to 200 | PPM, |
| $MnO_2$ | 0 to 0.6 | weight percent, | wherein the glass composition has a redox ratio up to 0.55, and the colorant and property modifying portion further comprises $Er_2O_3$ in a range of 0.5 to 1.5 weight percent or $Nd_2O_3$ in a range of 0.5 to 2 weight percent, wherein the colorant and property modifying portion comprises at least: CoO from 5 to 25 PPM, Se from 5 to 12 PPM, $Cr_2O_3$ from 20 to 200 PPM, CuO up to 0.1 weight percent, $V_2O_5$ up to 0.1 weight percent, $TiO_2$ from 0.2 to 0.6 weight percent, NiO from 10 to 50 PPM or $MnO_2$ from 0.2 to 0.4 weight percent.

10. A glass sheet comprising a glass composition that includes:

| | | |
|---|---|---|
| $SiO_2$ | 65 to 75 | weight percent, |
| $Na_2O$ | 10 to 20 | weight percent, |
| CaO | 5 to 15 | weight percent, |
| MgO | 0 to 5 | weight percent, |
| $Al_2O_3$ | 0 to 5 | weight percent, |
| $K_2O$ | 0 to 5 | weight percent, and |
| BaO | 0 to 1 | weight percent, | and a colorant and property modifying portion comprising:

| | | |
|---|---|---|
| total iron | up to 0.02 | weight percent, |
| $CeO_2$ | 0.05 to 1.5 | weight percent, |
| CoO | 0 to 50 | PPM, |
| Se | 0 to 15 | PPM, |
| $Cr_2O_3$ | 0 to 500 | PPM, |
| CuO | 0 to 0.5 | weight percent, |
| $V_2O_5$ | 0 to 0.3 | weight percent, |
| $TiO_2$ | 0 to 1 | weight percent, |
| NiO | 0 to 200 | PPM, |
| $MnO_2$ | 0 to 0.6 | weight percent, and | wherein the glass composition has a redox ratio up to 0.55, wherein the glass sheet exhibits an Lta of equal to or greater than 70 percent at a thickness of 0.223 inches (5.664 mm), and the colorant and property modifying portion further comprises Er₂O₃ in a range of 0.5 to 2 weight percent or Nd₂O₃ in a range of 0.5 to 2 weight percent.

11. The glass sheet according to claim 10, wherein at least one of the following materials is present in the recited amount: CoO from 2 to 35 PPM, Se from 3 to 14 PPM, Cr₂O₃ from 10 to 300 PPM, CuO up to 0.3 weight percent, V₂O₅ up to 0.2 weight percent, TiO₂ from 0.15 to 0.8 weight percent, NiO from 5 to 100 PPM, and MnO₂ from 0.1 to 0.5 weight percent.

12. A method of making a glass composition comprising: processing batch materials to form a glass composition comprising:

| | |
|---|---|
| SiO₂ | 65 to 75 weight percent, |
| Na₂O | 10 to 20 weight percent, |
| CaO | 5 to 15 weight percent, |
| MgO | 0 to 5 weight percent, |
| Al₂O₃ | 0 to 5 weight percent, |
| K₂O | 0 to 5 weight percent, and |
| BaO | 0 to 1 weight percent, | and a colorant and property modifying portion comprising:

| | |
|---|---|
| total iron | up to 0.02 weight percent, |
| CeO₂ | 0.05 weight percent to 1.5 weight percent, |
| CoO | 0 to 50 PPM, |
| Se | 0 to 15 PPM, |
| Cr₂O₃ | 0 to 500 PPM, |
| CuO | 0 to 0.5 weight percent, |
| V₂O₅ | 0 to 0.3 weight percent, |
| TiO₂ | 0 to 1 weight percent, |
| NiO | 0 to 200 PPM, and |
| MnO₂ | 0 to 0.6 weight percent, | wherein the glass composition has a redox ratio up to 0.55, and the colorant and property modifying portion further comprises Er₂O₃ in a range of 0.5 to 2 weight percent or Nd₂O₃ in a range of 0.5 to 2 weight percent.

13. The method according to claim 12, wherein at least one of the following materials is present in glass composition in the recited amount: CoO from 2 to 35 PPM, Se from 3 to 14 PPM, Cr₂O₃ from 10 to 300 PPM, CuO up to 0.3 weight percent, V₂O₅ up to 0.2 weight percent, TiO₂ from 0.15 to 0.8 weight percent, NiO from 5 to 100 PPM, and MnO₂ from 0.1 to 0.5 weight percent.

14. A method of making a glass composition comprising: processing batch materials to form a glass composition comprising:

| | |
|---|---|
| SiO₂ | 65 to 75 weight percent, |
| Na₂O | 10 to 20 weight percent, |
| CaO | 5 to 15 weight percent, |
| MgO | 0 to 5 weight percent, |
| Al₂O₃ | 0 to 5 weight percent, |
| K₂O | 0 to 5 weight percent, and |
| BaO | 0 to 1 weight percent, | and a colorant and property modifying portion comprising:

| | |
|---|---|
| total iron | up to 0.02 weight percent, |
| CeO₂ | 0.05 weight percent to 1.5 weight percent, |
| CoO | 0 to 50 PPM, |
| Se | 0 to 15 PPM, |
| Cr₂O₃ | 0 to 500 PPM, |
| CuO | 0 to 0.5 weight percent, |
| V₂O₅ | 0 to 0.3 weight percent, |
| TiO₂ | 0 to 1 weight percent, |
| NiO | 0 to 200 PPM, and |
| MnO₂ | 0 to 0.6 weight percent, | wherein the glass composition has a redox ratio up to 0.55, and the colorant and property modifying portion further comprises Er₂O₃ in a range of 0.5 to 1.5 weight percent or Nd₂O₃ in a range of 0.5 to 2 weight percent, wherein the colorant and property modifying portion comprises at least: CoO from 5 to 25 PPM, Se from 5 to 12 PPM, Cr₂O₃ from 20 to 200 PPM, CuO up to 0.1 weight percent, V₂O₅ up to 0.1 weight percent, TiO₂ from 0.2 to 0.6 weight percent, NiO from 10 to 50 PPM or MnO₂ from 0.2 to 0.4 weight percent.

15. The method according to claim 14, further comprising forming the glass composition into a flat sheet.

* * * * *